United States Patent
Georgis

(10) Patent No.: US 7,417,819 B2
(45) Date of Patent: Aug. 26, 2008

(54) EXTENDABLE VIRTUAL AUTOLOADER SYSTEMS AND METHODS

(75) Inventor: Steven P. Georgis, Boulder, CO (US)

(73) Assignee: ProStor Systems, Inc., Boulder, CO (US)

( * ) Notice: Subject to any disclaimer, the term of this patent is extended or adjusted under 35 U.S.C. 154(b) by 114 days.

(21) Appl. No.: 11/274,756

(22) Filed: Nov. 14, 2005

(65) Prior Publication Data

US 2006/0103966 A1    May 18, 2006

Related U.S. Application Data

(60) Provisional application No. 60/629,012, filed on Nov. 17, 2004.

(51) Int. Cl.
G11B 15/18    (2006.01)

(52) U.S. Cl. ........................................................ 360/69

(58) Field of Classification Search .................... 360/69, 360/55; 711/111, 147; 380/270; 713/168
See application file for complete search history.

(56) References Cited

U.S. PATENT DOCUMENTS

| | | | |
|---|---|---|---|
| 6,611,394 B1 | 8/2003 | Kato et al. | |
| 6,618,795 B2 | 9/2003 | Chan et al. | |
| 6,674,596 B1 | 1/2004 | Takayama | |
| 6,717,762 B1 | 4/2004 | Bauck et al. | |
| 6,717,769 B2 | 4/2004 | Staley et al. | |
| 6,779,077 B1 * | 8/2004 | Bakke et al. | 711/111 |
| 7,137,000 B2 * | 11/2006 | Hohberger et al. | 713/168 |
| 7,200,626 B1 * | 4/2007 | Hoang et al. | 707/204 |
| 2002/0194528 A1 * | 12/2002 | Hart | 714/6 |
| 2003/0059050 A1 * | 3/2003 | Hohberger et al. | 380/270 |
| 2003/0128454 A1 * | 7/2003 | Basham et al. | 360/69 |
| 2004/0107320 A1 * | 6/2004 | Gallo et al. | 711/147 |

OTHER PUBLICATIONS

"What Is iVDR?," printout from website http://www.ivdr.org/iVDR/ivdr_e.html, 2 pages, printout date: May 27, 2004.

* cited by examiner

*Primary Examiner*—Fred Tzeng
(74) *Attorney, Agent, or Firm*—Townsend and Townsend and Crew LLP

(57) ABSTRACT

A virtual cartridge autoloader system is provided. A first autoloader device has multiple cartridge holders. Each cartridge holder is configured for electrical communication with removable data cartridges having electronic interfaces. The first autoloader device performs virtual loading functions on the removable data cartridges using an electronic switch. A second autoloader device distinct from the first autoloader device is electrically interfaced with the first autoloader device. The second autoloader device also has multiple cartridge holders, each of which also is configured for electrical communication with removable data cartridges having electronic interfaces. The second autoloader device also performs virtual loading functions on the removable data cartridges using an electronic switch. A controller is configured to receive media changer commands from a host computer for the first autoloader device and for the second autoloader device. The autoloaders may thereby be operated as a single device.

26 Claims, 14 Drawing Sheets

EXTENDABLE VIRTUAL AUTOLOADER SYSTEMS AND METHODS

CROSS REFERENCE TO RELATED APPLICATION

This application is a nonprovisional of, and claims the benefit of the filing date of, U.S. Prov. Pat. Appl. No. 60/629,012, entitled "EXTENDABLE VIRTUAL AUTOLOADER SYSTEMS AND METHODS," filed Nov. 17, 2004 by Steven P. Georgis, the entire disclosure of which is incorporated herein by reference for all purposes.

BACKGROUND OF THE INVENTION

The present invention generally relates to data storage devices. More specifically, the present invention relates to removable cartridge storage devices.

Computer backup has traditionally been performed using tape drive technologies. Tape drive technologies have been popular in the use of backup systems for a variety of reasons. One reason is that tape media has generally had the lowest cost per bit of storage. Additionally, tape devices use removable tape cartridges, which may be taken to an off-site location to provide for disaster recovery. A third reason tape devices are popular is because of the long-term archive characteristics of tape media.

As the storage capacity in stand-alone and networked computers has increased, so have the demands on backup systems. One of the current trends is the use of mechanical automation systems, such as tape cartridge autoloaders and robotic tape libraries, to expand the capacity of the backup system. The cartridge autoloaders and tape libraries hold multiple removable tape cartridges. One or more tape drives is embedded inside a storage area containing one or more magazines of tape cartridges. These systems also include a mechanical system to automate the cartridge changing operation. The mechanical system is used to load and unload the cartridges between the magazines and the tape drives.

A prior art tape cartridge autoloader that may be used to automate cartridge changing operations is illustrated in FIG. 1. The tape autoloader 100 includes at least one tape drive 120. Multiple storage slots 111-117 are used to house tape cartridges 101-107. The storage slots 111-117 may be part of a removable magazine to facilitate the loading and unloading of cartridges.

A motorized mechanism 130 is used to move the tape cartridges 101-107 to and from the tape drive 120. The motorized mechanism may also optionally be used to move cartridges to and from an access opening (not shown) to the tape autoloader 100, which may be used to enter and remove tape cartridges 101-107 into the tape autoloader 100. The motorized mechanism 100 may include a cartridge picker arm 134 and a picker motor 132 to operate the cartridge picker arm 134. A drive motor 136 is used to drive the motorized mechanism 130.

The tape autoloader 100 typically has at least two interfaces 152, 154 to host computer 150. By way of example, interfaces 152, 154 may be Small Computer System Interfaces (SCSI) or Fiber Channel (FC)interfaces. An interface 154 is provided for each tape drive 120 included in the tape autoloader. This interface 154 may be referred to as the "data path" interface and is used to send data and tape drive commands to a system controller component of tape drive 120. The tape autoloader 100 may include multiple tape drives and the data path interfaces to each tape drive may be coupled to different host computers. A second interface 152 (also called the "control path") is used to send control commands to the autoloader mechanism controller 140, such as load, unload, and audit commands. The autoloader mechanism controller 140 includes electronics and software used to actuate the motorized mechanism 130 f 6 r movement of tape cartridges 101-107 and auditing of the tape autoloader 100. The control path interface 152 may be coupled to a second host computer. Some prior art tape autoloaders combine the functions of the "data path" and "control path" interfaces into a single physical interface.

The autoloader mechanism controller 140 is also communicatively coupled to tape drive 120 for communications between these components. Although multiple tape drives in the tape autoloader 100 may be operated in parallel, the mechanical system 130 used to load and unload cartridges can only move a single cartridge at a time. A separate "data path" interface to host computer 150 is required for each tape drive 120, as each tape drive has its own system controller.

As can be appreciated from the above description, the tape cartridge autoloader 100 can only hold a predetermined number of data cartridges 111-117. Other types of prior art autoloader devices (e.g., optical autoloader devices) also have the same limitation. Although these systems come in may different sizes and cartridge capacities, buyers may face a difficult dilemma when determining the capacity of the device that will best meet organizational requirements. Buyers may choose to either purchase a smaller capacity autoloader device to meet current needs and replace the device when capacity requirements increase or may choose to purchase a larger capacity device to meet future expected capacity requirements. The first alternative is disruptive when the organization/application upgrades to a larger capacity device and more costly since two devices are purchased. The second alternative has a high initial cost which may not be affordable or may be perceived to be unnecessary as larger capacity requirements may not be anticipated.

BRIEF SUMMARY OF THE INVENTION

Embodiments of the invention provide a virtual cartridge autoloader system as a stand-alone system comprising an array of autoloaders. The system is typically rack-mounted with a capability for expansion to increase storage capacity. The system thus addresses desires of users who want systems that a physically small and manageable, with a low entry cost, but still having the ability to accommodate later increases in storage needs. The expandable design may start with a single autoloader acting as a master module, with expansion modules being electrically connected to the master module, and controlled as a single larger system. The individual autoloaders do not need to be physically stacked or even necessarily be in the same room, although in some embodiments where the system is rack mounted, the modules may physically be stacked one on top of another.

Thus, in a first set of embodiments, a virtual cartridge autoloader system is provided. A first autoloader device is provided and comprises a first plurality of cartridge holders. Each such cartridge holder is configured for electrical communication with removable data cartridges having electronic interfaces. The first autoloader device is configured to perform virtual loading functions on the removable data cartridges using an electronic switch. As used herein, "virtual loading functions" includes at least virtually loading and/or virtually unloading the removable data cartridges. A second autoloader device is also provided, distinct from the first autoloader device and electrically interfaced with the first autoloader device. The second autoloader device comprises a second plurality of cartridge holders, each of which also is configured for electrical communication with removable data cartridges having electronic interfaces. The second autoloader device is configured to perform virtual loading functions on the removable data cartridges using an electronic switch. A controller is configured to receive media changer commands from a host computer for the first autoloader device and for the second autoloader device. The autoloaders thereby may be operated as a single device.

In some such embodiments, the second autoloader device comprises a plurality of daisy-chained second autoloader devices. In other such embodiments, the second autoloader device comprises a plurality of second autoloader devices provided in communication with the first autoloader device with point-to-point communications in a hub-and-spoke configuration. The first autoloader device may comprise a first primary computer interface and a first secondary computer interface. The second autoloader device may comprise a second primary computer interface. The first primary computer interface is in electrical communication with the host computer. The second primary computer interface is in electrical communication with the first secondary computer interface. In some of these embodiments, the controller may comprise a master controller and a slave controller. The master controller receives media changer commands from the host computer through the first primary computer interface. The slave controller receives media changer commands from the master controller through the second primary computer interface.

A third autoloader device distinct from the first and second autoloader devices may be provided and electrically interfaced with the second autoloader device. The third autoloader device also comprises a plurality of cartridge holders, with each cartridge holder being configured for electrical communication with removable data cartridges having electronic interfaces. In such an embodiment, the second autoloader device further comprises a second secondary computer interface and the third autoloader device comprises a third primary computer interface. The third primary computer interface is in electrical communication with the second secondary computer interface.

In embodiments having the third autoloader device, the controller may comprise a master controller and a plurality of slave controllers. The master controller receives media changer commands from the host computer through the first primary computer interface. A first of the plurality of slave controllers receives media changer commands from the master controller through the second primary computer interface. A second of the plurality of slave controllers receives media changer commands from the first of the plurality of slave controllers through the third primary computer interface.

The controller may in some embodiments comprise a host computer interface to receive data-transfer commands. For example, the host computer interface may comprises a first host computer interface to receive data-transfer commands for transfer of data to or from removable data cartridges in electrical communication with the first plurality of cartridge holders and a second host computer interface to receive data-transfer commands for transfer of data to or from removable data cartridges in electrical communication with the second plurality of cartridge holders.

In one such embodiment, the second autoloader device comprises a plurality of second autoloader devices. The first autoloader device is interfaced separately with each of the plurality of second autoloader devices to transmit the data-transfer commands to such each of the plurality of second autoloader devices when the data-transfer commands effect a transfer of data to or from removable data cartridges in electrical communication with such each of the plurality of second autoloader devices. The first autoloader device may be further interfaced separately with each of the plurality of second autoloader devices to transmit the media changer commands to the second autoloader devices.

In various embodiments, the controller may be further configured to emulate a tape autoloader device by executing one or more tape autoloader commands. Furthermore, the cartridge holders may be configured in several embodiments for electrical communication with data disk cartridges that include embedded hard disk drives.

In a second set of embodiments, a method is provided of operating a virtual cartridge autoloader system. A media changer command is received from a host computer. One of a plurality of interfaced autoloader devices is identified from the media changer command. Each of the autoloader devices comprises a respective plurality of cartridge holders. Each such cartridge holder is configured for electrical communication with removable data cartridges having electronic interfaces. Each of the autoloader devices is configured to perform virtual loading functions on the removable data cartridges using an electronic switch. The media changer command is transmitted to the identified one of the plurality of interfaced autoloader devices.

In one embodiment, the media changer command is transmitted by transmitting the media changer command to at least one intermediary autoloader device different from the identified one of the plurality of interfaced autoloader devices. The media changer command is then transmitted from the at least one intermediary autoloader device to the identified one of the plurality of interfaced autoloader devices.

In another embodiment, each of the plurality of interfaced autoloader devices comprises a primary computer interface and a secondary computer interface. The media changer command is received through the primary computer interface of a first of the plurality of interfaced autoloader devices. The media changer command is transmitted through the secondary computer interface of the first of the plurality of interfaced autoloader devices to the secondary computer interface of another of the plurality of interfaced autoloader devices.

In a further embodiment, a data-transfer command is received from the host computer. An identified removable data cartridge to of from which data are to be transferred is identified. The data-transfer command is transmitted to the autoloader device in communication with the identified removable data cartridge. The data-transfer command may be transmitted by transmitting the data-transfer command to at least one intermediary autoloader device different from the autoloader device in communication with the identified removable data cartridge. The data-transfer command is then transmitted from the at least one intermediary autoloader device to the autoloader device in communication with the identified removable data cartridge.

Methods may also be provided of operating an autoloader device within a virtual cartridge autoloader system comprising a plurality of interfaced autoloader devices. Each of the plurality of autoloader devices comprises a respective plurality of cartridge holders. Each cartridge holder is configured for electrical communication with removable data cartridges having electronic interfaces, and each of the autoloader devices is configured to perform virtual loading functions on the removable data cartridges using an electronic switch. In a first such method, a logical status of the autoloader device is determined as a master of the plurality of interfaced autoloader devices. A request is transmitted to others of the plurality of autoloader devices to identify slaves comprised by the plurality of interfaced autoloader devices. A response is received to the request identifying slaves comprised by the plurality of interfaced autoloader devices. A topology map is built of the virtual autoloader system with the response. For example, the topology map may comprise a logical-to-physical mapping that maps logical cartridge addresses to physical module numbers.

In another such method, a logical status of the autoloader device is determined as a slave within the virtual autoloader system. A request is received from a master of the plurality of interfaced autoloader devices requesting identification of slaves. A response to the request is transmitted identifying the autoloader device as a slave to permit the master to build a topology map of the virtual autoloader system.

BRIEF DESCRIPTION OF THE DRAWINGS

Illustrative embodiments in accordance with the invention are illustrated in the drawings in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
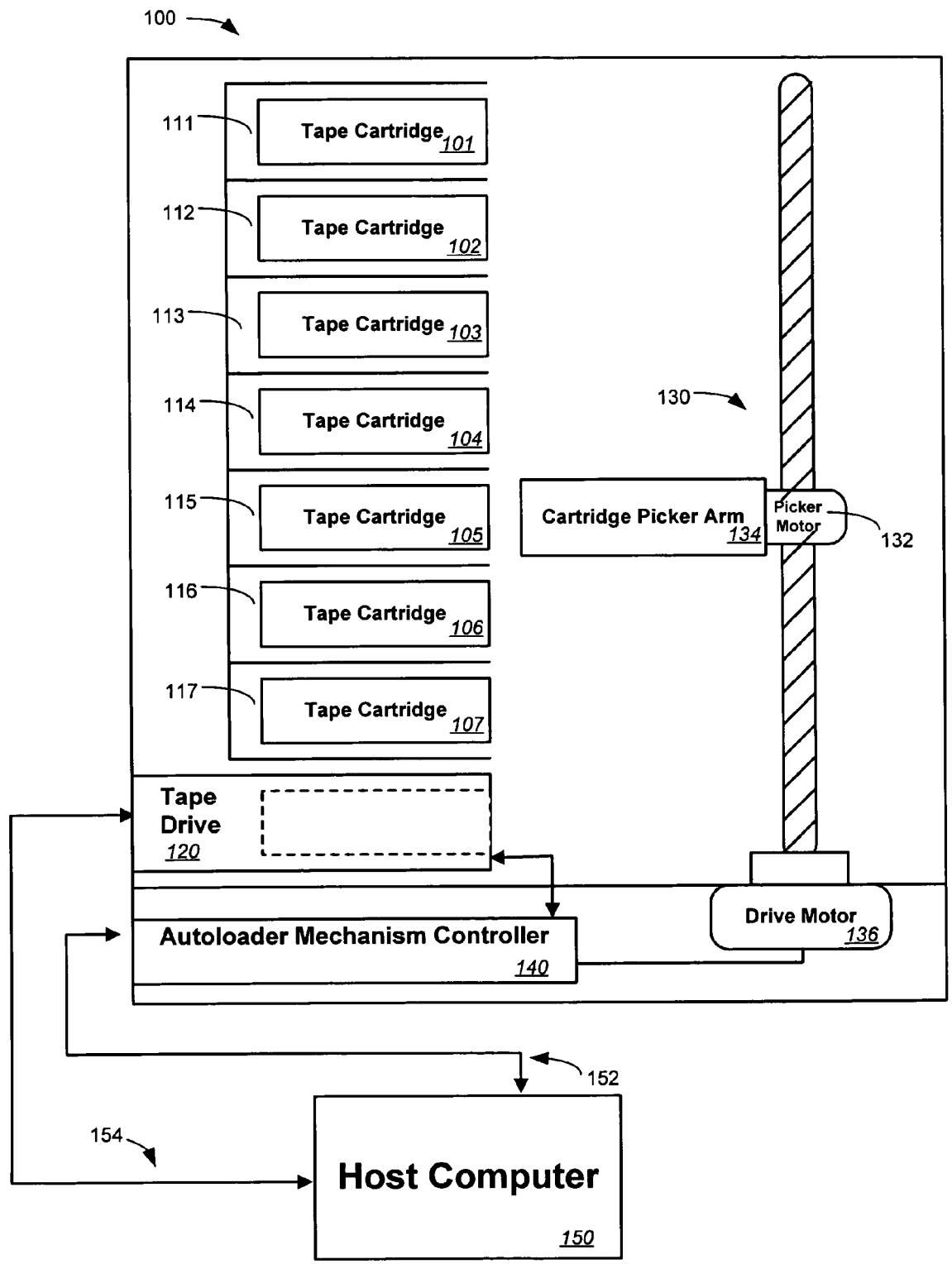
FIG. 1 illustrates a prior art tape autoloader.
Figure 2:
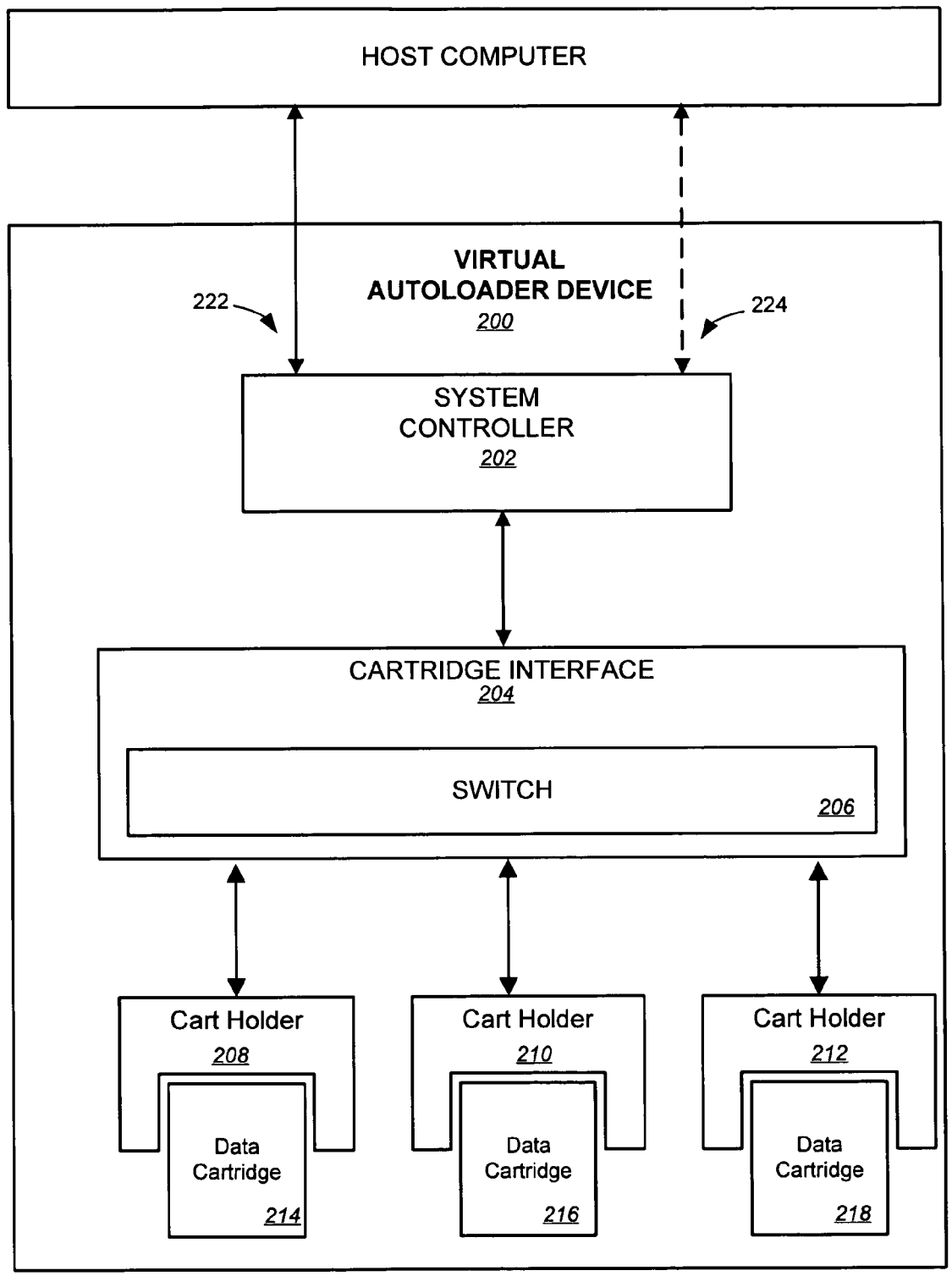
FIG. 2 illustrates an exemplary embodiment of a virtual autoloader system.

FIG. 2 illustrates an exemplary embodiment of a virtual autoloader device 200. The autoloader device 200 includes a system controller 202. System controller 202 may be used to manage communications and data transfers between autoloader device 200 and a host computer 220. Thus, system controller 202 may include one or more interfaces 222, 224 to host computer 220. By way of example, interface(s) to host computer may be Small Computer System Interface (SCSI), Fiber Channel (FC) interface, Ethernet interface, Advanced Technology Attachment (ATA) interface, or any other type of interface that allows autoloader device 200 to communicate with host computer 220. System controller 202 may also be used to perform functions to process data, such as data buffering, data compression, error correction coding (ECC), data formatting, error recovery, or other functions.

System controller 202 is communicatively coupled with cartridge interface 204. Cartridge interface 204 may comprise electronic circuitry which may be used to provide the physical electronic signaling to multiple data cartridges 214, 216, 218 to read and write data and to issue commands to data cartridges 214, 216, 218. Additionally, cartridge interface 204 includes a switch 206 or other type of electronic switching component, such as a multiplexer, expander, or other multi-port device, to electronically switch communications between system controller 202 and data cartridges 214, 216, 218. In one embodiment, cartridge interface 204 may comprise a multi-port Serial-ATA ("SATA") or multi-port Serial Attached SCSI ("SAS") controller. In larger array systems (e.g., in array systems greater than eight cartridges), the system controller 202 may include multiple electronic components and processes to simultaneously manage a subset of the data cartridges 214, 216, 218, each subset coupled with its own cartridge interface 204.

Cartridge interface 204 is communicatively coupled with a plurality of cartridge holders 208, 210, 212. Data cartridges 214, 216, 218 may each be removably coupled with one of the cartridge holders 208, 210, 212. Although FIG. 2 illustrates data cartridges 214, 216, 218 inserted into cartridge holders 208, 210, 212, it should be appreciated that at times, one or more of the cartridge(s) 214, 216, 218 may not be inserted into its respective cartridge holder 208, 210, 212, or different cartridges may be inserted into the cartridge holders 208, 210, 212. It should be appreciated that in alternative embodiments, the autoloader device 200 may include fewer or additional cartridge holders to electronically couple data cartridges with autoloader 200.

In some embodiments, the autoloader device 200 may emulate a tape autoloader, a tape library, or optical-disk library. Thus, the autoloader device 200 may appear to software applications executing on host computer 220 (e.g., backup applications) as a tape autoloader or other removable-media library. System controller 202 or another component may be used to provide the functionality to emulate a tape autoloader. Commands that are received may be translated to the appropriate command for the virtual autoloader device 200. For example, commands such as load and unload may be translated into commands that cause the cartridge interface 204 to electronically switch from one cartridge 214, 216, 218 to another cartridge. Additionally, tape device commands may be translated into the appropriate commands for the data cartridges 214, 216, 218. In some cases, commands may be ignored if there is no corresponding command for the virtual autoloader device 200.

It should be appreciated that autoloader device 200 advantageously switches between cartridges electronically, instead of mechanically. Additionally, unlike virtual tape systems based on fixed configurations of disk drives (e.g. RAID), the autoloader device 200 may be used with independent removable media cartridges 214, 216, 218 that each contains its own data set. As will be described in further detail below, autoloader device 200 may be part of an extendable system to allow organizations to easily add additional data storage capacity. Another capability provided by autoloader device 200 is that a single system controller may be used to control data operations for multiple data cartridges. Thus, data may be copied from one data cartridge 214 to a second data cartridge 216 using the single system controller 202. The use of one system controller 202 may also allow sequential load and copy functions to be performed in parallel, thereby providing the functions of an autoloader and a mirroring system with a single controller. For instance, the system controller 202 may be able to operate all of the cartridges 214, 216, 218 close to simultaneously by bursting data to a buffer memory (e.g. RAM) embedded in a data cartridge 214, 216, 218 and then electronically switching to a different cartridge while the first data cartridge processes the burst data. Other capabilities may also be provided by autoloader device 200 which uses a single system controller 202 to manage multiple removable data cartridges 214, 216, 218.

Figure 3A:
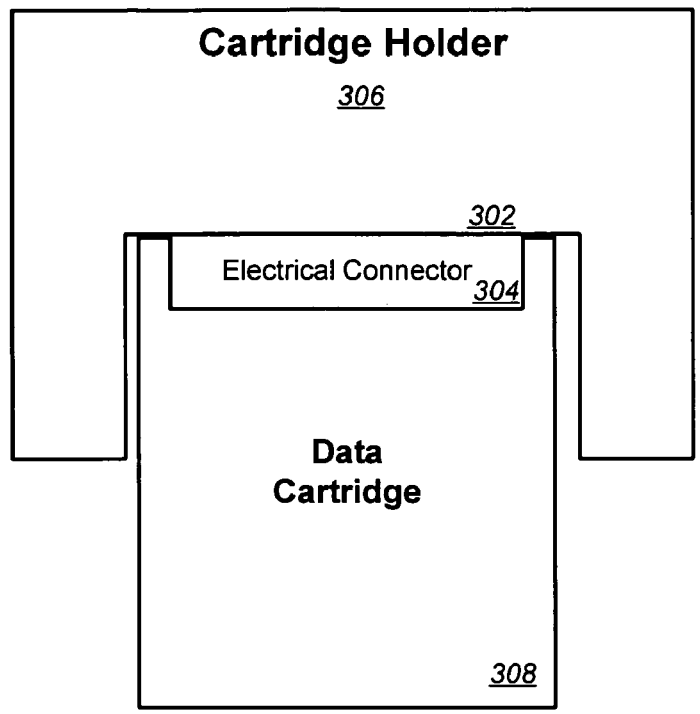
FIG. 3A illustrates an exemplary embodiment of a cartridge holder.

FIG. 3A illustrates an exemplary coupling between a cartridge holder 306 and a data cartridge 308. Cartridge holder 306 includes an electrical connector 302. Data cartridge 308 also includes an electrical connector 304. Thus, data cartridge 308 may be electrically coupled to the cartridge holder 306 by mating its electrical connector 304 with the electrical connector 302 of the cartridge holder 306.

Figure 3B:
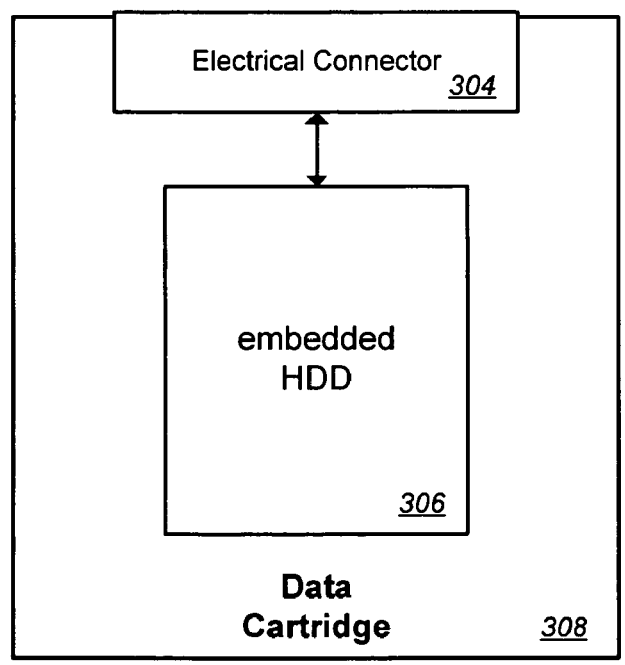
FIG. 3B illustrates an exemplary embodiment of a removable data cartridge.

FIG. 3B illustrates an exemplary embodiment of a removable data cartridge 308 which may be used in the removable cartridge disk device 300. The data cartridge 308 includes the electrical connector 304 previously discussed for mating the data cartridge 308 to the cartridge holder 306, which allows removable cartridge disk device 300 to read data from the cartridge, write data to the cartridge, and issue commands to the cartridge. Data cartridge 308 also includes an embedded hard disk drive (HDD) 306. HDD 306 may include functionality similar to a standard HDD. For instance, HDD 306 may be used to store data by issuing a read command to the data cartridge 308 via electrical connector 304. Other known disk commands may also be issued to HDD 306 via the electrical connector interface 304. Data cartridge 308 may have functional characteristics similar to a tape cartridge, such as an ergonomic form and low cost. In other embodiments, data cartridge 308 may not include an embedded HDD 306, but instead may include another type of data storage that has an electronic interface, such as optical or electronic flash storage. Further details of features that may be included in data cartridge 308 may be found in provisional patent application No. 60/586,087 entitled "STORAGE CARTRIDGE," filed Jul. 6, 2004, the entirety of which is hereby incorporated by reference for all purposes.

Figure 4:
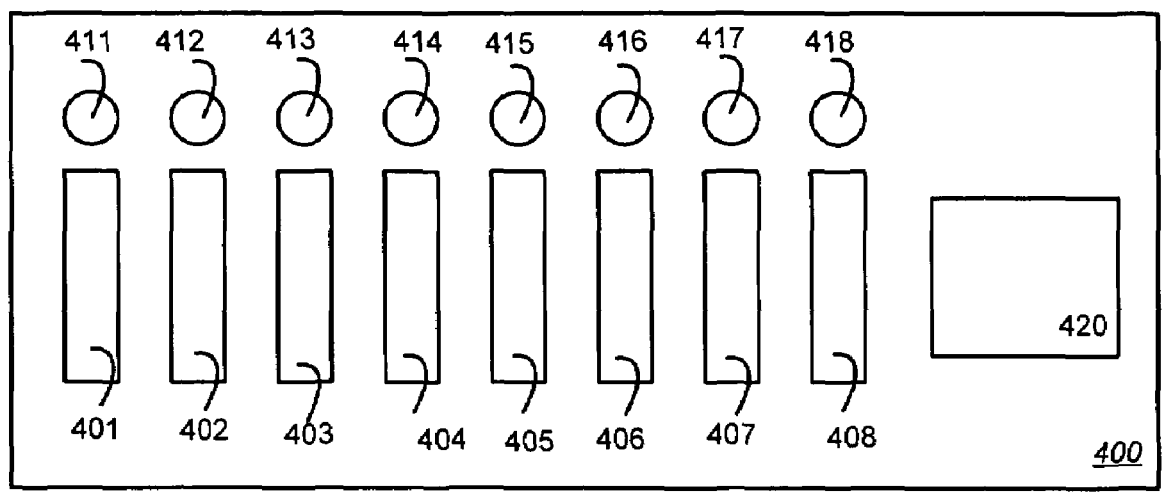
FIG. 4 illustrates an exemplary front view of a virtual cartridge autoloader.

FIG. 4 illustrates a front view of a exemplary virtual autoloader device 400. The device 400 includes a plurality of cartridge holders 401-408 for receiving removable cartridges. Each cartridge holder may have an associated eject button 411-418 for ejecting the cartridge from the cartridge holder. Additionally, in some embodiments, status indicators (not shown), such as light emitting diode (LED) status indicators, may also be provided for each cartridge. The removable cartridge device may further include a control panel interface 420 to display autoloader device information, configure the autoloader device 400, load and unload removable data cartridges, power on/off the autoloader, and/or reset the autoloader 400. It should be appreciated that in alternative embodiments, the removable cartridge autoloader device 400 may include additional or fewer cartridge holders 401-408. Additionally, a front view of an autoloader device may include fewer or additional components than shown in FIG. 4. Additionally, the data cartridges may or may not be accessible from the front panel. Some embodiments may have cartridge holders that are recessed into the autoloader device and not visible from the front panel.

Figure 5A:
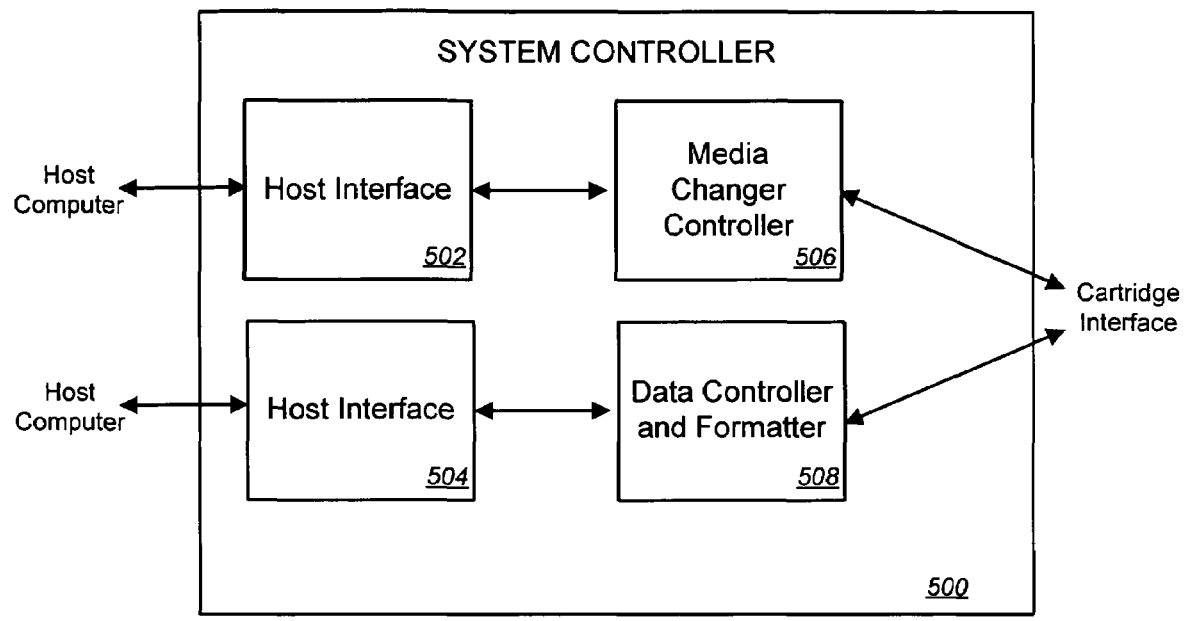
FIG. 5A illustrates an exemplary embodiment of components of a system controller.

FIG. 5A illustrates an exemplary embodiment of components that may be included in a system controller 500. System controller 500 includes a host interface 502, such as a SCSI, FC, Ethernet, iSCSI, or other type of communications interface. Host interface 502 may be used to send and receive media changer communications to and from a host computer. In one embodiment, media changer communications may be a standardized communication protocol, such as the SCSI-3 Media Changer command set. Other communication protocols may also be used.

System controller 500 also includes an additional host computer interface 504 (SCSI, FC, iSCSI, etc.) which may be used to receive data and commands to control the transfer/formatting of data from a host computer. Host computer interface 504 may also be used to transfer data (e.g., for restore operations) and results of data operations from the system controller 500 to the host computer. The host computer may either be the same or different host computer than that communicating with host computer interface 502.

Functionality performed by system controller 500 may be logically partitioned into a media changer controller (MCC) 506 and data controller/formatter 508. MCC 506 is communicatively coupled with host computer interface 502. MCC 506 may be used to process media changer commands, such as audit commands or commands to electronically switch between data cartridges. Data controller 508 is communicatively coupled with host computer interface 504 and may be used to control data transfers and formatting of data. By way of example, data formatting operations performed by data controller 508 may include block packing, data compression, header creation, or other formatting to prepare data for recording on one or more cartridges in a native format of the cartridge. System controller 500 may optionally include a data buffer (not shown) that may be used by data controller 508 during transfer/formatting operations.

In some embodiments, MCC 506 may be used to emulate a tape autoloader. Media changer commands received from a host computer may thus be translated by MCC 506 into the appropriate commands (if any) for the virtual autoloader device and translate results into the format expected by host computer. By way of example, MCC 506 may process a load command by electrically switching the switch to the appropriate cartridge. In some cases, data controller 508 may also emulate a tape drive, optical drive, hard disk drive, or other type of device.

It should be appreciated that FIG. 5A illustrates an exemplary logical partitioning of functionality performed by system controller 500. MCC 506 and data controller 508 may be components of the same or different processor and may be implemented as one or more embedded software processes. It should also be appreciated that system controller 500 may include additional components.

Figure 5B:
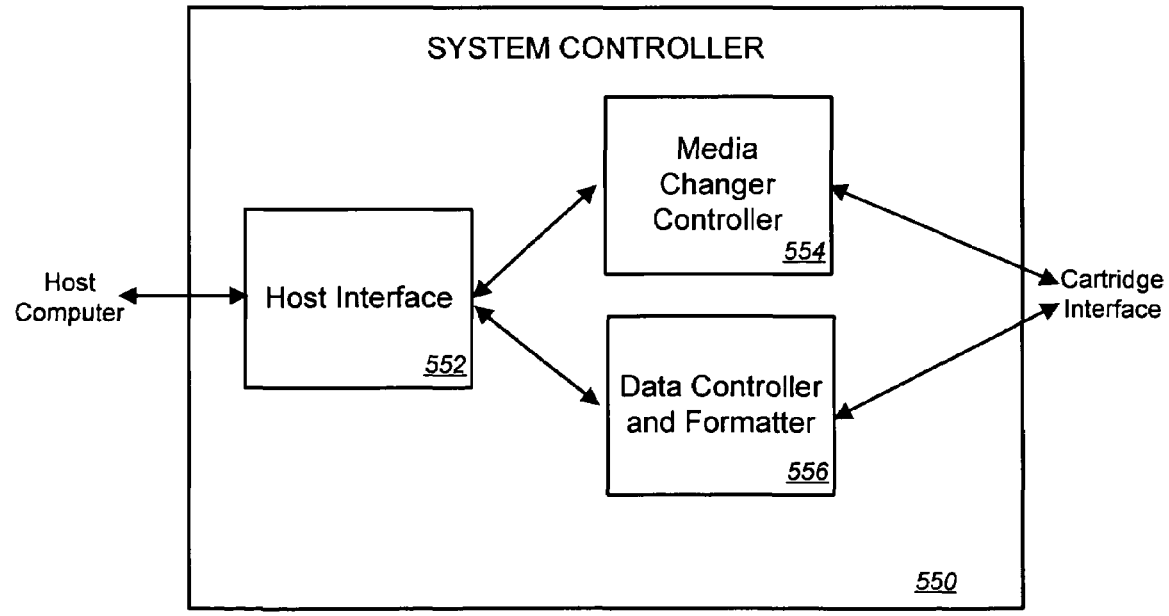
FIG. 5B illustrates a second exemplary embodiment of components of a system controller.

FIG. 5B illustrates a second exemplary embodiment of components that may be included in a system controller 550. This embodiment is similar to that described with reference to FIG. 5A, with the difference being that a single host computer interface 552 is shared by both media changer controller 554 and data controller 556. In this embodiment, the system controller 550 may use two or more logical unit numbers ("LUNs") as separate channels on which to receive media changer commands and data transfer commands.

Figure 6:
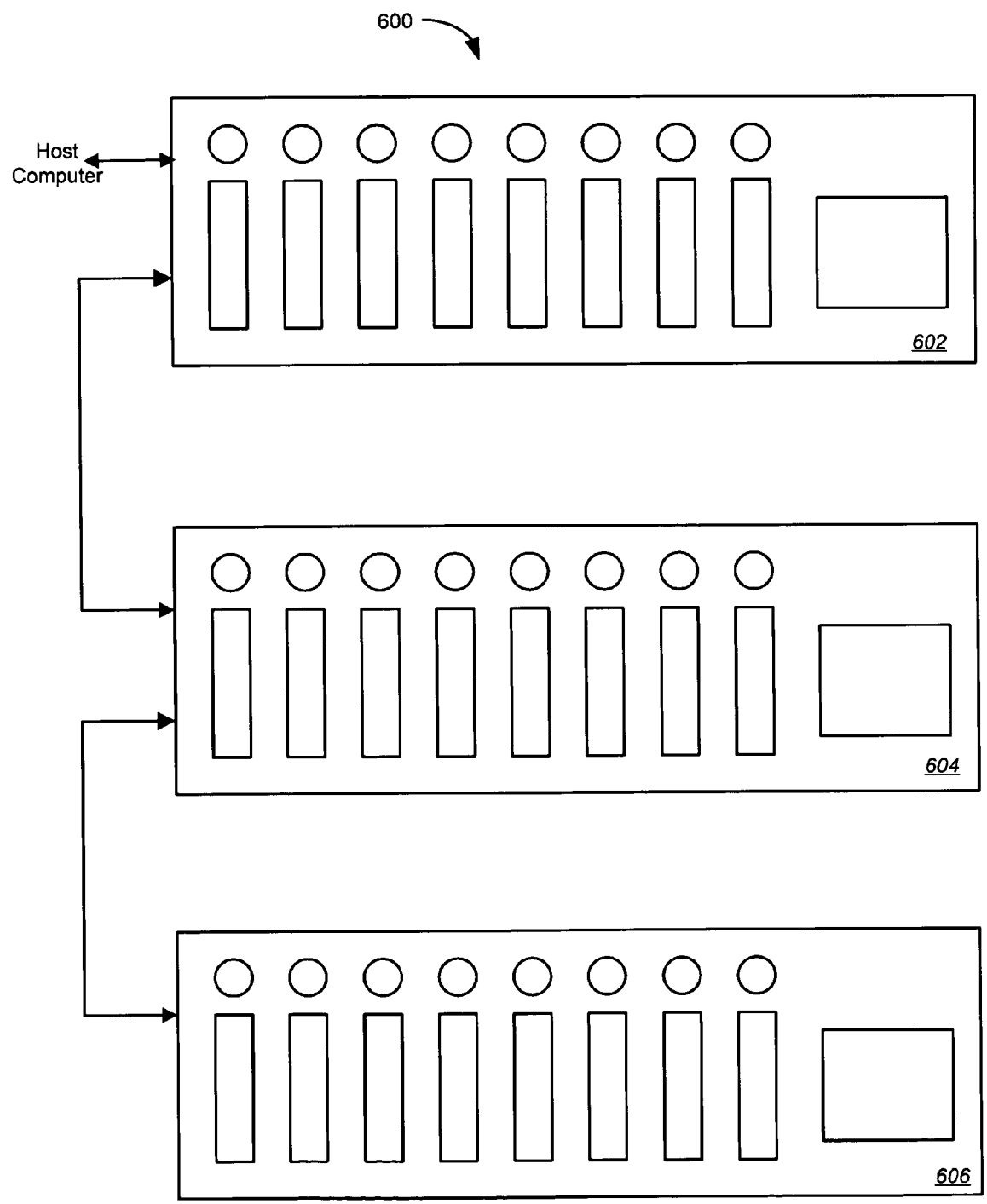
FIG. 6 illustrates an exemplary overview of interconnecting multiple virtual autoloader devices.

FIG. 6 illustrates an overview of an autoloader system with extended capacity. The autoloader system 600 includes a plurality of virtual autoloader devices 602, 604, 606. The autoloader devices are electrically interconnected to create a larger single virtual autoloader system which may be controlled as a single system. One of the autoloader modules 602 may be used to control the remaining autoloader modules 604, 606. As will be described in further detail below, only the master autoloader module 602 may be connected to a host computer for media changer control operations. Unlike prior-art mechanical libraries designed for modular expansion using complex mechanical linkages, embodiments of the invention advantageously use electrical interconnection to expand the number of cartridges in the autoloader, thus making expansion simpler and more economical.

Figure 7:
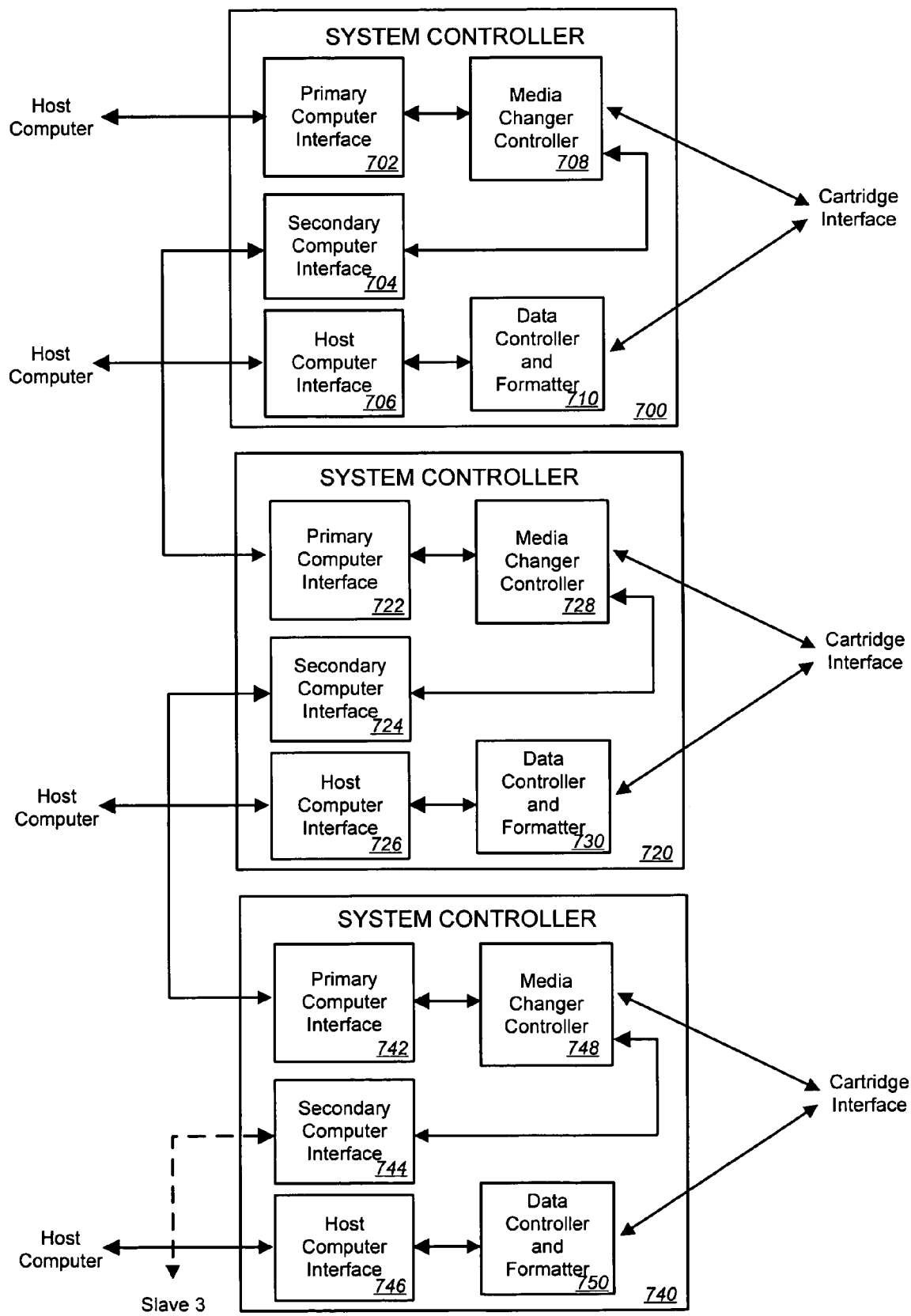
FIG. 7 illustrates an exemplary interconnection of multiple system controllers in an autoloader system.

FIG. 7 illustrates an exemplary embodiment of electrically coupling multiple system controllers into a single autoloader system. Each of the system controllers 700, 720, 740 may be associated with a modular virtual autoloader device, such as that described with reference to FIG. 2. System controllers each include primary computer interfaces 702, 722, 742. Primary computer interfaces 702, 722, 742 may be used for media changer communications are thus each coupled with media changer controllers 708, 728, 748 of each respective system controller 700, 720, 740.

Each of the system controllers 700, 720, 740 also include secondary computer interfaces 704, 724, 744 that may be used to electrically couple autoloader devices together. The primary interface 702 of the master autoloader device is connected to a host computer and the secondary interface 704 of the master autoloader device is connected to the primary computer interface 722 of the second system controller 720 (associated with a second autoloader device). Similarly, the secondary computer interface 724 of the second system controller is connected to the primary computer interface 742 of the third system controller 740 (associated with a third autoloader device). It should be appreciated that additional autoloader devices may be added to the system by similar electrical connections.

Each system controller 700, 720, 740 also includes a media changer controller (MCC) 708, 728, 748. The MCCs 708, 728, 748 are each coupled with the primary interfaces 702, 722, 742 and secondary interfaces 704, 724, 744 of their respective system controllers 700, 720, 740. Thus, MCC 708 associated with the master system controller 700 may use the electrical couplings to issue media changer commands to the MCCs 728, 748 associated with the slave system controllers 720, 740 and to receive command results or other media changer information.

In one embodiment, upon system initialization, the master system controller 700 communicates with each of the slave system controllers 720, 740 via the electrical interconnections to determine how may slave modules are present and to calculate the total size of the virtual array. The master system controller 700 may then assign an identifying number to each data cartridge holder associated with the slave modules. The cartridges in all the modules may then be managed and controlled as a single pool. If the host computer responsible for media changer operations issues a query to master system controller 700, MCC 708 may report the total size of the virtual array and the cartridge identifiers. MCC 708 may also report the physical groupings of the cartridges to its host computer.

In operation, when the host computer issues a command to MCC 708 to load a cartridge, the master MCC 708 may determine the target module (which may, in some instances, be the master autoloader device) which physically houses the requested cartridge. If it is a slave module, MCC 708 may route the command to the appropriate MCC 728, 748 using the electrical couplings between primary/secondary computer interfaces 704/722, 724/724. The target MCC 708, 728, 748 may then switch its multi-port switch to select the requested cartridge, making it ready for data transfer operations. Similarly, unload operations may deselect an active cartridge. Alternatively, unload operations may be ignored as the switching can occur when a new load command is received.

In the illustrated embodiment, each of the system controllers 700, 720, 740 also includes an additional host computer interface 706, 726, 746 communicatively coupled with either the same host computer as is coupled with the primary computer interface 702 or one or more additional host computers. The system controllers 700, 720, 740 each further include a data controller/formatter 710, 730, 750 coupled with the host computer interface 706, 726, 746 of the respective system controller 700, 720, 740. Host computer interfaces 706, 726, 746 may be used for data path communications and data controllers 710, 730, 750 may be used to control data operations for the data cartridges of their respective autoloader devices.

Figure 8:
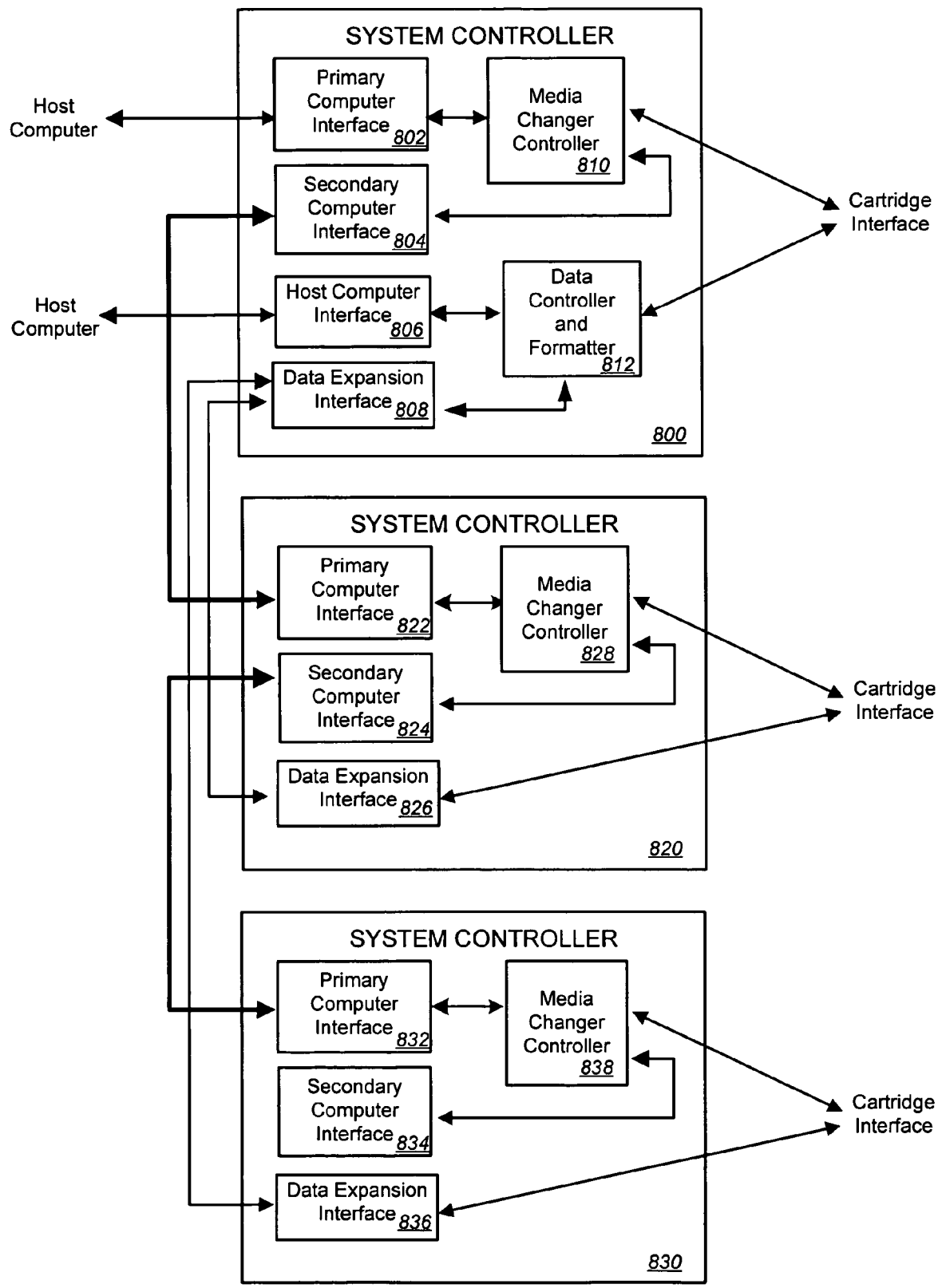
FIG. 8 illustrates a second exemplary embodiment of the interconnection between multiple system controllers in an autoloader system.

FIG. 8 illustrates a second exemplary electrical coupling of multiple system controllers (each associated with a virtual autoloader device as described with reference to FIG. 2) into a single autoloader system. In this embodiment, the autoloader system may communicate with a single host computer for data path communications. Each of the system controllers 800, 820, 830 include a primary computer interface 802, 822, 832, a secondary computer interface 804, 824, 834, and a media changer controller 810, 828, 838. Each of these components is coupled together in them manner described with reference to FIG. 7.

Master system controller 800 further includes a host computer interface 806 coupled to either the same or different host computer as primary computer interface 802 (data path host computer) and a data controller/formatter 812 to control data operations and transfer of data for all of the data cartridges in the virtual array. System controllers 800, 820, 830 also each further include data expansion interfaces 808, 826, 836, which may be used to couple the system controllers together 800, 820, 830 for data path communications. By way of example, data expansion interfaces 808, 826, 836 may be external Serial ATA interfaces (eSATA), SAS or iSCSI.

Data expansion interface 808 is coupled with both data expansion interface 826 and data expansion interface 836. Additionally, data expansion interface 808 is coupled with data controller/formatter 812. The data expansion interfaces 826, 836 of the slave system controllers 820, 830 are each coupled to a cartridge interface of the associated autoloader devices. Thus, system controller 800 use the connection between data expansion interfaces 808/826 and 808/836 to send and receive data to any of the data cartridges in the autoloader system. This may reduce the expense of the slave modules, as the system controllers 820, 830 may not need their own data controllers. It should be appreciated that the autoloader system may include additional or fewer system controllers of autoloader device modules.

Figure 9:
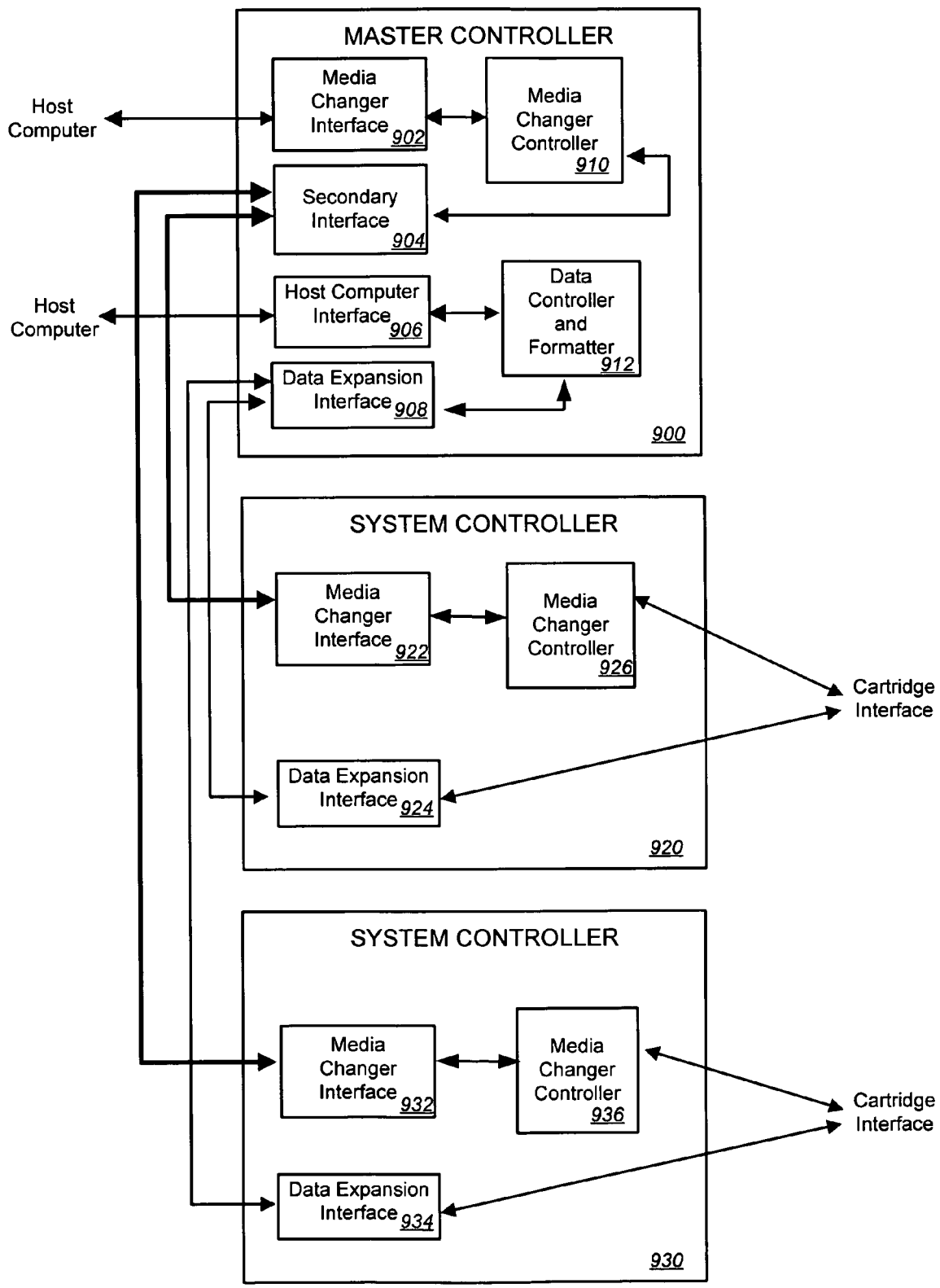
FIG. 9 illustrates a third exemplary embodiment of the interconnection between multiple system controllers in an autoloader system.

FIG. 9 illustrates another exemplary embodiment of electrically coupling multiple system controllers into a single autoloader system. System controllers 920 and 930 are each associated with a tape autoloader device (slave modules), such as that described with reference to FIG. 2. Master controller 900 may not be associated with its own autoloader device, but instead may be used to control both the media changer and data transfer operations of the slave modules associated with system controllers 920, 930. Master controller 900 may be used to control additional or fewer slave system controllers than that illustrated.

Master controller 900 and each of the system controllers 920, 930 include a media changer interface 902, 922, 932. The media changer interface 902 of the master controller 900 is coupled with a host computer. Master controller 900 also includes a media changer controller 910 coupled with media changer interface 902. Media changer interface 902 may be used for media changer communications between host computer and MCC 910.

Master controller 900 further includes a secondary interface 904, coupled with MCC 910, and with each of the media changer interfaces 922, 932 of the slave system controllers 920, 930. Each of the MCCs 926, 936 are also communicatively coupled with a cartridge interface of the respective autoloader device module. Thus, MCC 900 may use the communication connections 904/922, 904/932 to route media changer commands to the appropriate system controller MCC 926, 936 for processing and to receive results back from the system controller MCC 926, 936.

Similar to that described with reference to FIG. 8, Master controller 900 also includes a host computer interface 906 coupled with a host computer and a data controller/formatter 912 for controlling data path operations. The master controller 900 also includes a data expansion interface 908, coupled to data controller 912, and to a data expansion interface 924 of system controller 920 and a data expansion interface 934 of system controller 934. Thus, as described above, system controller 900 may be used to control the data path communications for the cartridges included in the autoloader system.

In an alternative embodiment similar to that described for FIG. 9, the master controller 900 may omit the data controller and formatter 912. Instead, it may pass data-transfer commands via the data expansion interface 908 to the host computer interfaces of slave module system controllers such as those shown in FIG. 7. In this case, each slave module has its own data controller and formatter. In such a configuration, LUNs may be used to emulate multiple independent host computer interfaces and permit simultaneous data transfers to multiple cartridges. This method provides an economical way of emulating a tape library system having multiple tape drives.

Figure 10A:
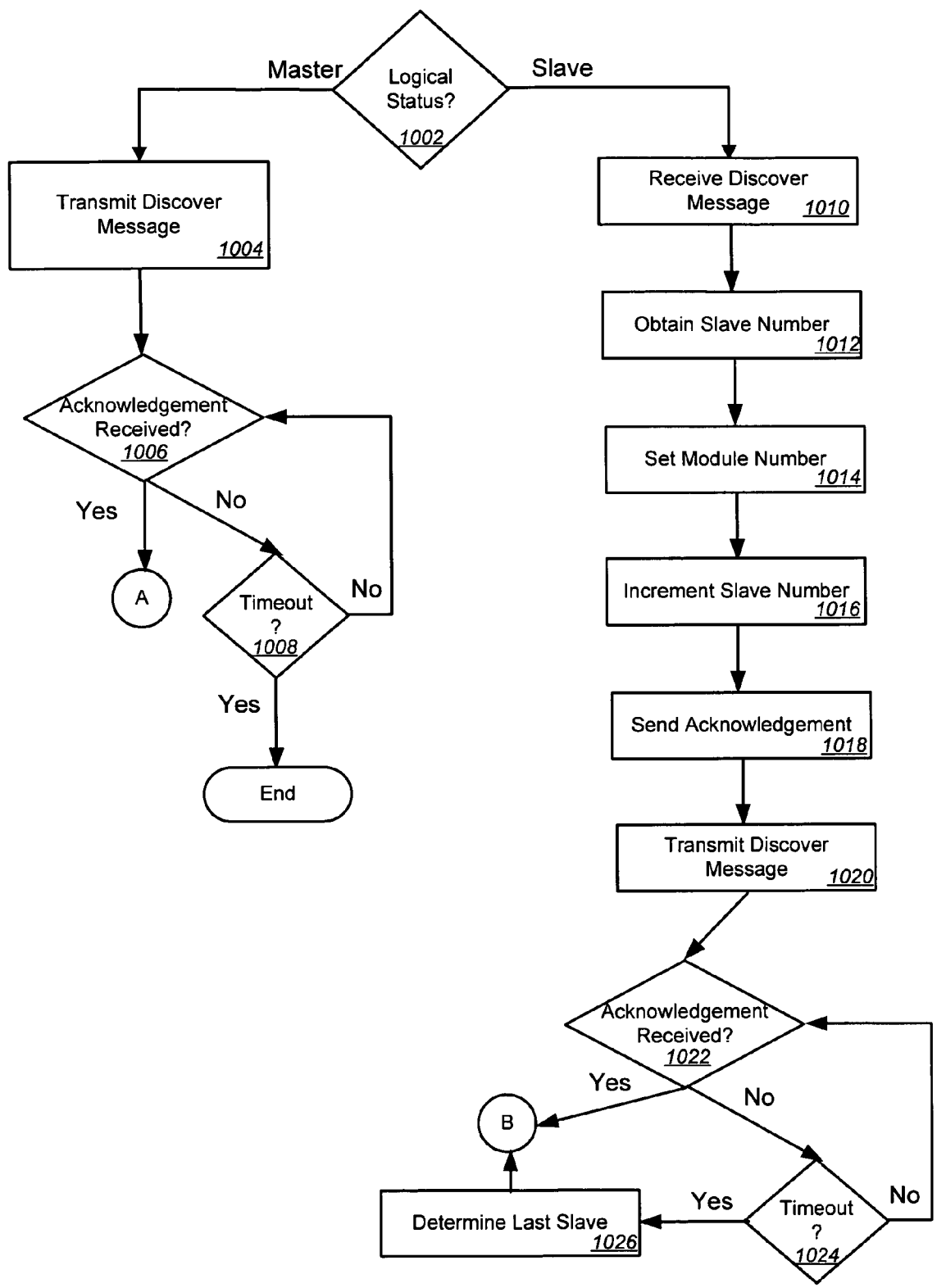
FIGS. 10A-10C illustrate an exemplary method that may be used to discover a topology of an autoloader system.
Figure 10B:
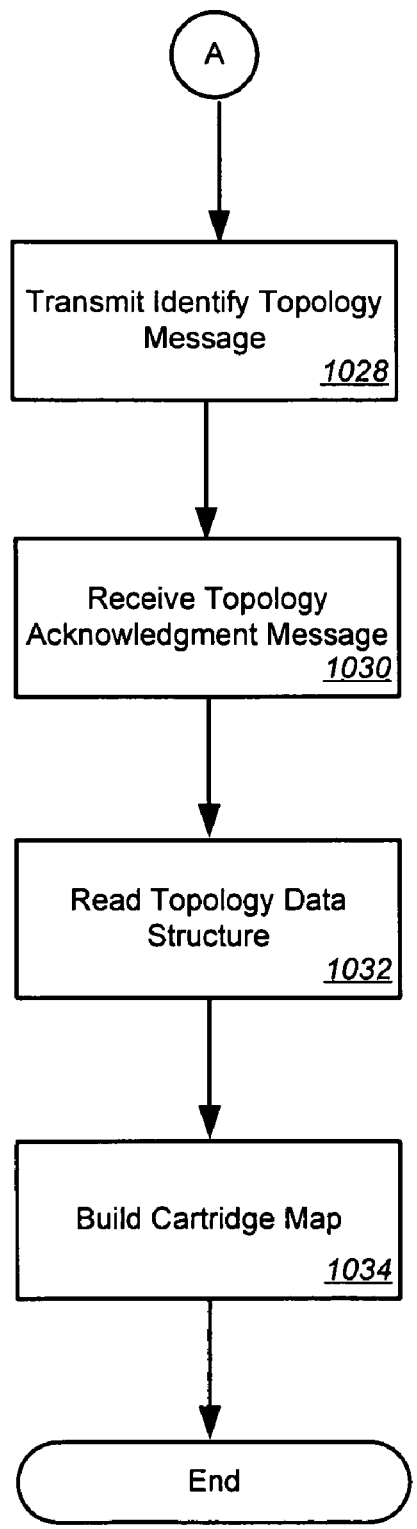
Figure 10C:
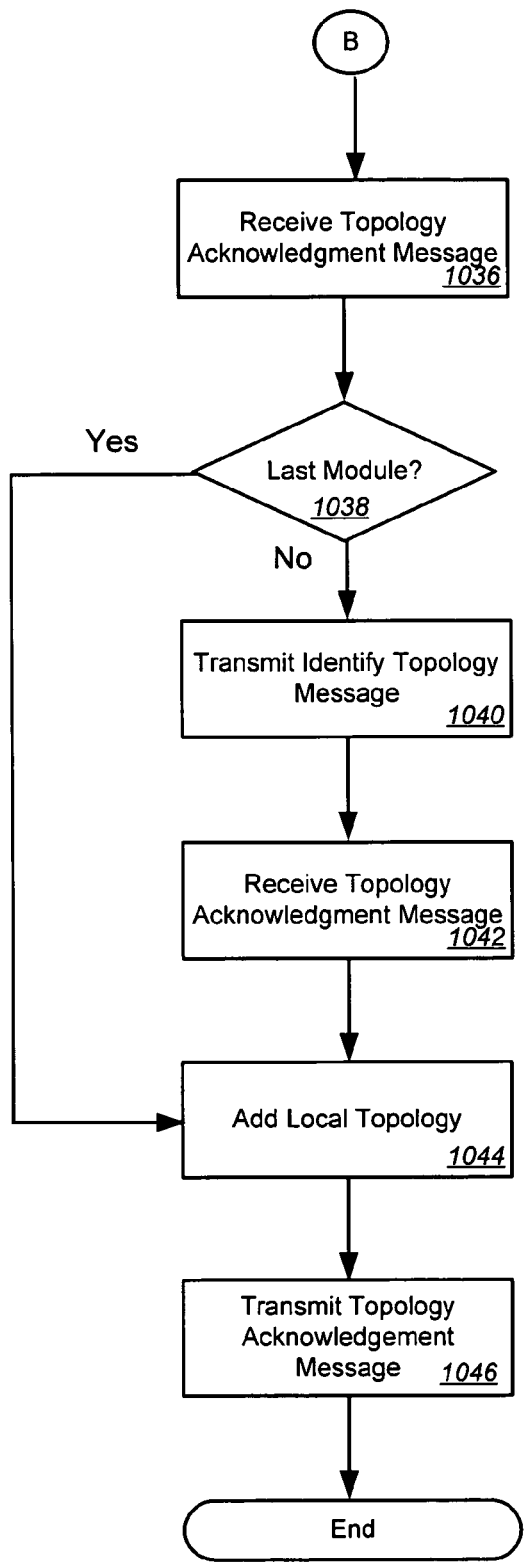

FIGS. 10A-10C illustrate an exemplary process that may be performed by an autoloader system, such as the autoloader system described in the embodiment of FIG. 7, to discover the topology (configuration) of the autoloader system. The topology discovery process may begin at system initialization (e.g., during power on or reset of the system) or upon request. Each of the autoloader device modules included in the system may determine 1002 its logical status indicating whether the respective module is a master module or a slave module. In one embodiment, the logical status may be determined 1002 by detecting a switch setting indicating the logical status. Other appropriate mechanisms may also be used.

If the module determines its logical status 1002 to indicate that it is the master module, the master module may transmit 1004 a discover message. By way of example, the discover message 1004 may be transmitted over a secondary interface associated with the master module. In some instances, the discover message may include a module number that may be used by the slave module to set its module number.

If an acknowledgment to the discover message is received 1006, at least one slave module is present. The method may continue at block A, which will be described below with reference to FIG. 10B. If an acknowledgement is not received 1006 and a predetermined time period has expired 1008, there are no slave modules present. Thus, the topology discovery process may end. As will be described further below, in some instances, the master module may then transmit a logical to physical mapping indicating its own topology to a host computer coupled to its primary interface.

If the module determines 1002 it is a slave module, it may receive 1010 a discover message on its primary interface. The discover message may have been received from the master module or a slave module in an earlier position in the chain. In some embodiments, the discover message may include a module number. The module number may be used by the slave module to set 1014 its own module number indicating the slave module's position in the chain. For example, the slave module may set its module number to the number indicated by the message. Alternatively, the slave module may first increment the number and then set its module number to the incremented value.

At some point after the receipt 1010 of the discover message, the slave module sends 1018 an acknowledgement of the message on its primary interface. Additionally, the slave module may transmit 1020 a discover message on its secondary interface to determine if another slave module is connected to it. If an acknowledgement is received 1022 before a predetermined time period has expired 1024, there is a slave module connected to the slave module. If an acknowledgement is not received 1022 before the predetermined time period has expired 1024, the slave module may determine 1026 it is the last slave module. Regardless of whether an acknowledgement is received 1022, the method may continue at block B which will be described in further detail with reference to FIG. 10C.

After the master module receives an acknowledgement to the discover message, the master module may continue the topology discovery process. As illustrated in FIG. 10B, the master module may transmit 1028 an identify topology message on its secondary interface. A topology acknowledgement message is received 1030 which indicates the slave module numbers in the autoloader system. The topology acknowledgement message may also include other information about the slave modules, such as the number of cartridge slots included in the slave module and the slots which have data cartridges loaded.

The master module may read 1032 the topology data structure included in the topology acknowledgement message and use the information to build 1032 a logical to physical mapping (e.g., table) which maps logical cartridge addresses to physical module numbers and slot number locations. Table 1 illustrates an exemplary mapping in which there are four modules included in the autoloader system. Physical module 0 is the master module and physical modules 1-3 are slave modules. Each module has five associated cartridge slots. Each cartridge slot is assigned a logical cartridge number. The table further includes the current load status of each of the cartridge slots. After the logical to physical cartridge map is built 1034, the master module may transmit the mapping to a host computer coupled to its primary interface and the discover topology process may end.

TABLE 1

| Log. Cart # | Phys. Mod # | Phys. Slot # | Status |
| --- | --- | --- | --- |
| 1 | 0 | 1 | Loaded |
| 2 | 0 | 2 | Not Loaded |
| 3 | 0 | 3 | Not Loaded |
| 4 | 0 | 4 | Not Loaded |
| 5 | 0 | 5 | Loaded |
| 6 | 1 | 1 | Loaded |
| 7 | 1 | 2 | Not Loaded |
| 8 | 1 | 3 | Loaded |
| 9 | 1 | 4 | Not Loaded |
| 10 | 1 | 5 | Loaded |
| 11 | 2 | 1 | Loaded |
| 12 | 2 | 2 | Not Loaded |
| 13 | 2 | 3 | Loaded |
| 14 | 2 | 4 | Loaded |

TABLE 1-continued

| Log. Cart # | Phys. Mod # | Phys. Slot # | Status |
| --- | --- | --- | --- |
| 15 | 2 | 5 | Loaded |
| 16 | 3 | 1 | Not Loaded |
| 17 | 3 | 2 | Loaded |
| 18 | 3 | 3 | Loaded |
| 19 | 3 | 4 | Loaded |
| 20 | 3 | 5 | Not Loaded |

It should be appreciated that autoloader systems may have topologies different than indictated by Table 1. For example, the autoloader system may have the ability to limit access to cartridges only through certain Host Computer Interfaces, such as illustrated in FIG. 7. Alternatively, all cartridges may be accessible through a single Host Computer Interface as in the exemplary embodiment of FIG. 8. Additionally, it should be appreciated that alternative embodiments may logically map cartridges differently than shown in Table 1 and not all embodiments will include the status of the cartridge slots or may include additional information.

FIG. 10C picks up with a slave module receiving 1036 an identify topology message. The identify topology message may have been transmitted by the master module or a slave module in an earlier position in the chain. If the slave module is not the last module 1038, it may transmit 1040 an identify topology message on its secondary interface, which is coupled to the next slave module in the chain.

The slave module may then receive 1042 a topology acknowledgement message 1042 indicating the module numbers of additional slaves at a lower position in the chain. As previously described, the topology acknowledgement message may also include other information about the slave modules, such as the number of cartridge slots included in the slave module and the slots which have data cartridges loaded. The slave module may then add 1044 its own topology information to the message data structure. If the slave module is the last module 1038, it may first create the topology acknowledgement message and then add 1044 its topology information to the message data structure. The slave module may then transmit 1046 the topology acknowledgement message on its primary interface to the module at the next highest position in the chain. Thus, the master module may receive 1030 the topology acknowledgement message with the topology of the slave modules in the autoloader system.

As previously described, in some embodiments, the topology acknowledgement message may include information indicating a status (e.g., loaded, not loaded) of each of the cartridge slots. Thus, in some cases, slave modules may preemptively transmit an acknowledgement message or other type of message indicating a change of topology when a cartridge is inserted or removed from a module.

It should be appreciated that a number of variations may be made to the discover topology method described in reference to FIGS. 10A-10C. For instances, in some embodiments, the acknowledgement message to the discover message may include topology information and thus identify topology messages may not be transmitted. As another example, a slave module may transmit its own topology information, which may be forwarded on by slave modules in higher positions in the chain to the master module. The master module may then determine the topology by compiling the messages received. Variations may also be made to the method to accommodate for different autoloader system configurations, such as the configuration described in FIG. 9 in which each slave module is directly coupled with the master module. Other variations are also contemplated.

Figure 11:
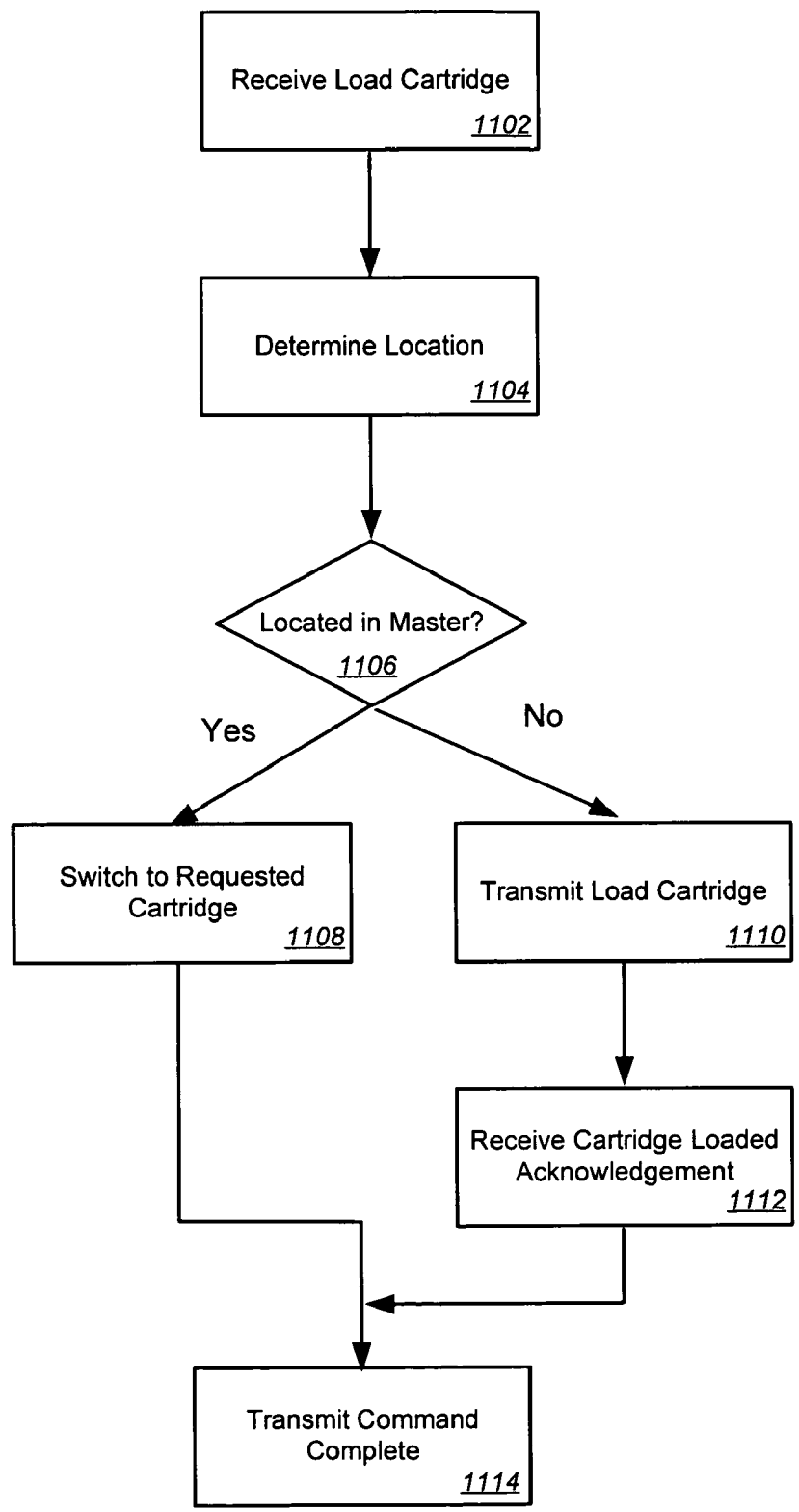
FIG. 11 illustrates an exemplary method that may be used by a master module in an autoloader system to load a cartridge.

FIG. 11 illustrates a method that may be used by a master module to respond to a load cartridge command. The method may begin by the master module receiving 1102 a load cartridge command from a host computer. The master module may then determine 1104 the location of the cartridge number requested by the load command. By way of example, the master module may use a logical to physical mapping to translate a logical cartridge number specified by the load command to a physical module number and slot number location.

If the cartridge is located in the master module 1106, the master module may cause its cartridge interface to electronically switch 1108 to the requested cartridge. Otherwise, if the cartridge is not located in the master module 1106, the master module may transmit 1110 a load cartridge command on its secondary port. The load cartridge command transmitted 1110 may specify the module number and slot number location of the requested cartridge. The master module may then receive 1112 a cartridge loaded acknowledgement on its secondary interface acknowledging the targeted slave module completed the electrically switching to the requested cartridge. The master module may then transmit 1114 a command complete to the host computer acknowledging the cartridge is now ready for data transfer from the host computer.

Figure 12:
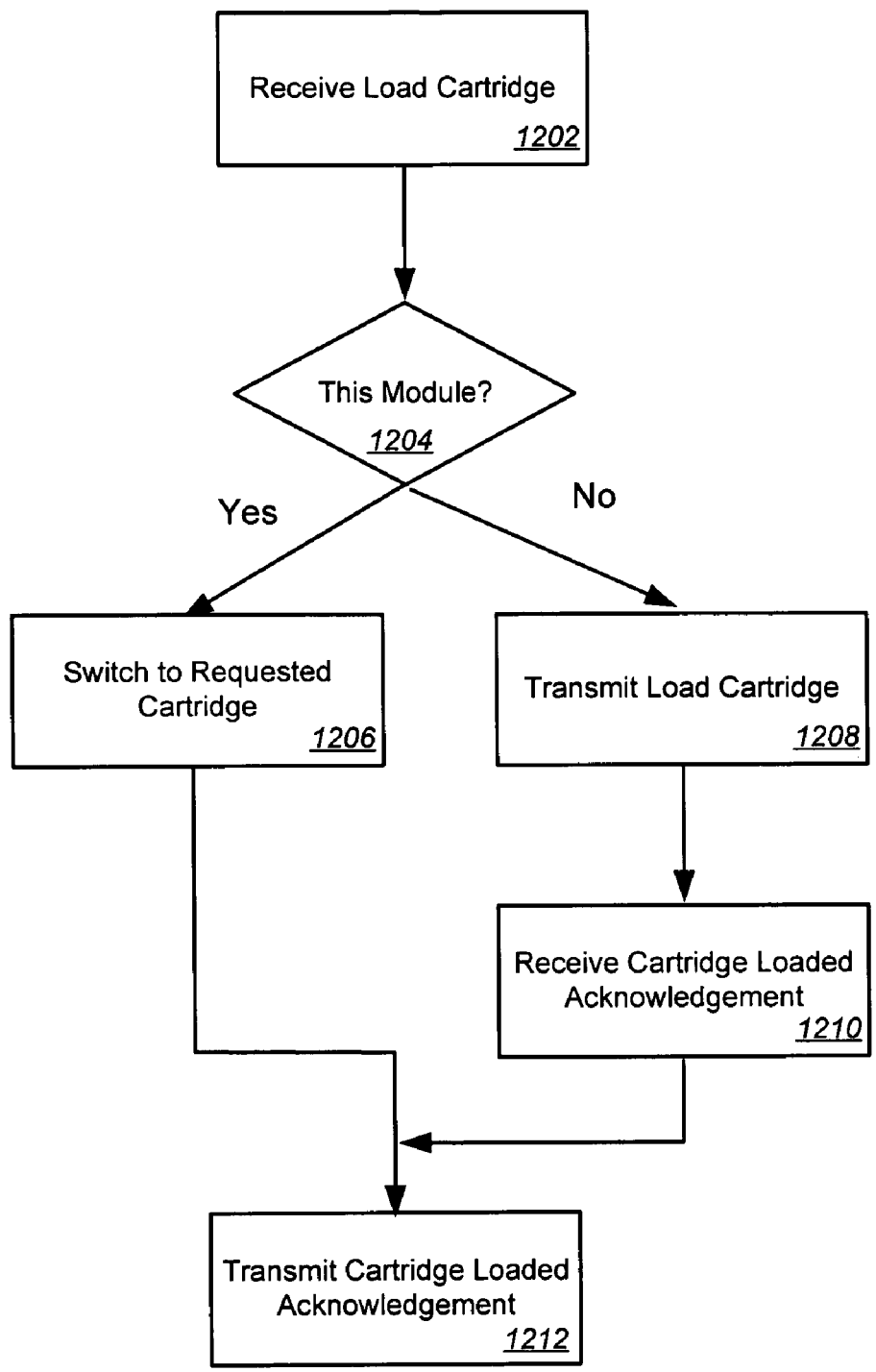
FIG. 12 illustrates an exemplary method that may be used by a slave module in an autoloader system to load a cartridge.

FIG. 12 illustrates an exemplary method that may be performed by a slave module in an autoloader system upon receipt of a load cartridge command. The method may begin by receiving 1202 a load cartridge command on the slave module's primary interface. The command may have been received 1202 from the master module or another slave module at a higher position in the chain. If 1204 the cartridge location specified by the command is located in the slave's module, the slave module may cause its cartridge interface to electronically switch 1206 to the requested cartridge. The slave module may then transmit 1212 a cartridge loaded acknowledgement on its primary interface, which may be forwarded by any intermediary slave modules until it reaches the master module.

If 1204 the requested cartridge is not located in the slave module, the slave module may transmit 1208 the load cartridge command on its secondary interface to the next lowest slave module in the chain. A cartridge loaded acknowledgement may then be received 1210 on the secondary interface. The slave module may then transmit 1212 the cartridge loaded acknowledgement on its primary interface.

As described with reference to FIG. 7, in some embodiments, each module may have its own Host Computer Interface. In those embodiments, once the requested cartridge is loaded by the appropriate module, the host computer may select the module's Host Computer Interface to transmit data to the Data Controller and Formatter. Alternatively, in embodiment like those depicted in FIG. 8 or FIG. 9, the host computer may transmit data via a common Host Computer Interface, and the Data Expansion Interface may be switched to route the data transmission to the Data Expansion Interface of the target module.

In the foregoing description, for the purposes of illustration, methods were described in a particular order. It should be appreciated that in alternate embodiments, the methods may be performed in a different order than that described. Additional methods or alternative methods are also contemplated to perform the functionality or variations of the functionality of one or more of the components described above. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A virtual cartridge autoloader system comprising:
a first autoloader device comprising a first plurality of cartridge holders, each such cartridge holder being configured for electrical communication with removable data cartridges having electronic interfaces, wherein the first autoloader device is configured to perform virtual loading functions on the removable data cartridges using an electronic switch;
a second autoloader device distinct from the first autoloader device and electrically interfaced with the first autoloader device, the second autoloader device comprising a second plurality of cartridge holders, each such cartridge holder being configured for electrical communication with removable data cartridges having electronic interfaces, wherein the second autoloader device is configured to perform virtual loading functions on the removable data cartridges using an electronic switch; and
a controller configured to receive media changer commands from a host computer for the first autoloader device and for the second autoloader device,
whereby the autoloaders may be operated as a single device.

2. The virtual cartridge autoloader system recited in claim 1 wherein the second autoloader device comprises a plurality of daisy-chained second autoloader devices.

3. The virtual cartridge autoloader system recited in claim 1 wherein the second autoloader device comprises a plurality of second autoloader devices, each of the plurality of second autoloader devices provided in communication with the first autoloader device with a point-to-point connection.

4. The virtual cartridge autoloader system recited in claim 1 wherein:
the first autoloader device comprises a first primary computer interface and a first secondary computer interface;
the second autoloader device comprises a second primary computer interface;
the first primary computer interface is in electrical communication with the host computer; and
the second primary computer interface is in electrical communication with the first secondary computer interface.

5. The virtual cartridge autoloader system recited in claim 4 wherein:
the controller comprises a master controller and a slave controller;
the master controller receives media changer commands from the host computer through the first primary computer interface; and
the slave controller receives media changer commands from the master controller through the second primary computer interface.

6. The virtual cartridge autoloader system recited in claim 4 further comprising a third autoloader device distinct from the first and second autoloader devices and electrically interfaced with the second autoloader device, the third autoloader device comprising a plurality of cartridge holders, each such cartridge holder being configured for electrical communication with removable data cartridges having electronic interfaces,
wherein:
the second autoloader device further comprises a second secondary computer interface;
the third autoloader device comprises a third primary computer interface; and
the third primary computer interface is in electrical communication with the second secondary computer interface.

7. The virtual cartridge autoloader system recited in claim 6 wherein:
the controller comprises a master controller and a plurality of slave controllers;
the master controller receives media changer commands from the host computer through the first primary computer interface;
a first of the plurality of slave controllers receives media changer commands from the master controller through the second primary computer interface; and
a second of the plurality of slave controllers receives media changer commands from the first of the plurality of slave controllers through the third primary computer interface.

8. The virtual cartridge autoloader system recited in claim 1 wherein the controller comprises a host computer interface to receive data-transfer commands.

9. The virtual cartridge autoloader system recited in claim 8 wherein the host computer interface comprises a first host computer interface to receive data-transfer commands for transfer of data to or from removable data cartridges in electrical communication with the first plurality of cartridge holders and a second host computer interface to receive data-transfer commands for transfer of data to or from removable data cartridges in electrical communication with the second plurality of cartridge holders.

10. The virtual cartridge autoloader system recited in claim 8 wherein:
the second autoloader device comprises a plurality of second autoloader devices;
the first autoloader device is interfaced separately with each of the plurality of second autoloader devices to transmit the data-transfer commands to such each of the plurality of second autoloader devices when the data-transfer commands effect a transfer of data to or from removable data cartridges in electrical communication with such each of the plurality of second autoloader devices.

11. The virtual cartridge autoloader system recited in claim 10 wherein the first autoloader device is further interfaced separately with each of the plurality of second autoloader devices to transmit the media changer commands to the second autoloader devices.

12. The virtual cartridge autoloader system recited in claim 8 wherein the first autoloader device is interfaced separately with each of the plurality of second autoloader devices to transmit the media changer commands to the second autoloader devices.

13. The virtual cartridge autoloader system recited in claim 1 further comprising a third autoloader device distinct from the first and second autoloader devices, the third autoloader device comprising the controller and interfaced separately with the first and second autoloader devices to transmit the media changer commands to the first and second autoloader devices.

14. The virtual cartridge autoloader system recited in claim 1 wherein the controller is further configured to execute one or more media-changer library commands to emulate a device.

15. The virtual cartridge autoloader system recited in claim 1 wherein the controller is configured to execute one or more tape autoloader commands to emulate a tape autoloader device.

16. The virtual cartridge autoloader system recited in claim 1 wherein the first and second plurality of cartridge holders are configured for electrical communication with data disk cartridges that include embedded hard disk drives.

17. A method of operating a virtual cartridge autoloader system, the method comprising:
receiving a media changer command from a host computer;
identifying, from the media changer command, one of a plurality of interfaced autoloader devices, each of the autoloader devices comprising a respective plurality of cartridge holders, each such cartridge holder being configured for electrical communication with removable data cartridges having electronic interfaces, and each of the autoloader devices being configured to perform virtual loading functions on the removable data cartridges using an electronic switch; and
transmitting the media changer command to the identified one of the plurality of interfaced autoloader devices.

18. The method recited in claim 17 wherein the plurality of interfaced autoloader devices are daisy-chained.

19. The method recited in claim 17 wherein the plurality of interfaced autoloader devices are interfaced in a hub-and-spoke configuration.

20. The method recited in claim 17 wherein transmitting the media changer command comprises:
transmitting the media changer command to at least one intermediary autoloader device different from the identified one of the plurality of interfaced autoloader devices; and
transmitting the media changer command from the at least one intermediary autoloader device to the identified one of the plurality of interfaced autoloader devices.

21. The method recited in claim 17 wherein:
each of the plurality of interfaced autoloader devices comprises a primary computer interface and a secondary computer interface;
receiving the media changer command comprises receiving the media changer command through the primary computer interface of a first of the plurality of interfaced autoloader devices; and
transmitting the media changer command comprises transmitting the media changer command through the secondary computer interface of the first of the plurality of interfaced autoloader devices to the secondary computer interface of another of the plurality of interfaced autoloader devices.

22. The method recited in claim 17 further comprising:
receiving a data-transfer command from the host computer;
identifying, from the data-transfer command, an identified removable data cartridge to or from which data are to be transferred; and
transmitting the data-transfer command to the autoloader device in communication with the identified removable data cartridge.

23. The method recited in claim 22 wherein transmitting the data-transfer command comprises:
transmitting the data-transfer command to at least one intermediary autoloader device different from the autoloader device in communication with the identified removable data cartridge; and
transmitting the data-transfer command from the at least one intermediary autoloader device to the autoloader device in communication with the identified removable data cartridge.

24. A method of operating an autoloader device within a virtual cartridge autoloader system comprising a plurality of interfaced autoloader devices, each of the plurality of autoloader devices comprising a respective plurality of cartridge holders, each such cartridge holder being configured for electrical communication with removable data cartridges having electronic interfaces, and each of the autoloader devices being configured to perform virtual loading functions on the removable data cartridges using an electronic switch, the method comprising:
determining a logical status of the autoloader device as a master of the plurality of interfaced autoloader devices;
transmitting a request to others of the plurality of autoloader devices to identify slaves comprised by the plurality of interfaced autoloader devices;
receiving a response to the request identifying slaves comprised by the plurality of interfaced autoloader devices; and
building a topology map of the virtual autoloader system with the response.

25. The method recited in claim 24 wherein the topology map comprises a logical-to-physical mapping that maps logical cartridge addresses to physical module numbers.

26. A method of operating an autoloader device within a virtual cartridge autoloader system comprising a plurality of interfaced autoloader devices, each of the plurality of autoloader devices comprising a respective plurality of cartridge holders, each such cartridge holder being configured for electrical communication with removable data cartridges having electronic interfaces, and each of the autoloader devices being configured to perform virtual loading functions on the removable data cartridges using an electronic switch, the method comprising:
determining a logical status of the autoloader device as a slave within the virtual autoloader system;
receiving a request from a master of the plurality of interfaced autoloader devices requesting identification of slaves; and
transmitting a response to the request identifying the autoloader device as a slave to permit the master to build a topology map of the virtual autoloader system.

* * * * *

UNITED STATES PATENT AND TRADEMARK OFFICE
CERTIFICATE OF CORRECTION

| | |
|---|---|
| PATENT NO. | : 7,417,819 B2 |
| APPLICATION NO. | : 11/274756 |
| DATED | : August 26, 2008 |
| INVENTOR(S) | : Steven P. Georgis |

It is certified that error appears in the above-identified patent and that said Letters Patent is hereby corrected as shown below:

Column 2, line 5, delete "f6r" and insert --for--

Column 13, line 13, delete "indictated" and insert --indicated--

Signed and Sealed this

Twenty-eighth Day of October, 2008

JON W. DUDAS
*Director of the United States Patent and Trademark Office*